United States Patent
Yoshida et al.

(10) Patent No.: US 7,178,989 B2
(45) Date of Patent: *Feb. 20, 2007

(54) OPTICAL RECEPTACLE AND OPTICAL SUB-ASSEMBLY USING THE SAME

(75) Inventors: Kazunori Yoshida, Osaka (JP); Hiromi Nakanishi, Osaka (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 165 days.

This patent is subject to a terminal disclaimer.

(21) Appl. No.: 10/866,073

(22) Filed: Jun. 14, 2004

(65) Prior Publication Data

US 2005/0013556 A1    Jan. 20, 2005

(30) Foreign Application Priority Data

Jun. 16, 2003 (JP) .............................. 2003-171033

(51) Int. Cl.
G02B 6/36 (2006.01)

(52) U.S. Cl. ............................ 385/79; 385/76; 385/78; 385/93

(58) Field of Classification Search .................. 385/88, 385/91–93
See application file for complete search history.

(56) References Cited

U.S. PATENT DOCUMENTS 4,487,474 A * 12/1984 Nishie et al. ................. 385/66

2001/0024551 A1 * 9/2001 Yonemura et al. ............ 385/88
2003/0215192 A1 * 11/2003 Durrant et al. ............... 385/85

FOREIGN PATENT DOCUMENTS

JP          09152524 A   *   6/1997
JP          10-332988         12/1998

* cited by examiner

Primary Examiner—Frank G. Font
Assistant Examiner—Erin D. Chiem
(74) Attorney, Agent, or Firm—Smith, Gambrell & Russell, LLP

(57) ABSTRACT

The present invention provides an optical receptacle having a superior insertion/extraction performance of the ferrule, and an optical sub-assembly applying the optical receptacle. The optical receptacle 1 includes a stub, a bush 4, a sleeve, and a sleeve cover. The stub having a lower portion covered by the bush, and an upper portion covered by the sleeve. The sleeve may be a rigid sleeve without any slit along the optical axis in its outer surface. The sleeve cover covers the sleeve and the bush. In the present optical receptacle, the bush is press-fitted into the gap formed between the stub and the sleeve cover. Accordingly, in addition to the application of the rigid sleeve, not only the sub is hard to slide out from the sleeve, but also the insertion/extraction performance of the ferrule to be inserted into the sleeve may be enhanced.

13 Claims, 5 Drawing Sheets

OPTICAL RECEPTACLE AND OPTICAL SUB-ASSEMBLY USING THE SAME

BACKGROUND OF THE INVENTION

1. Field of the Invention

The present invention relates to an optical receptacle, and an optical sub-assembly using the optical receptacle.

2. Related Prior Art

FIG. 5 shows a conventional optical receptacle 100, which includes a stub 102, a split sleeve 104, a bush 106, and a sleeve cover 108. These parts have a tubular shape. The stub 102 secures a coupling fiber 102a in the center thereof. The split sleeve 104, which has a slit along the axis thereof, holds the stub 102 in one end thereof, and receives an optical ferrule 110 from the other end. Accordingly, the ferrule and the coupling fiber 102a secured in the stub 102 can be optically coupled with respect to each other. The end of the split sleeve 104 is press-fitted by the bush 106, namely, the bush 106 is press-fitted in the space formed between the split sleeve 104 and the sleeve cover 108. The sleeve cover 108 covers the sleeve 104 therein.

The split sleeve intrinsically has the enhanced insertion/extraction performance of the ferrule, which is caused by the resilient characteristic, widening and recovering of the slit of the ferrule. In the conventional configuration shown in FIG. 5, since the bush secures the end of the split sleeve, the insertion/extraction performance thereof may be restricted. Further, the stub may slip out from the split sleeve when the end of the split sleeve is deformed. Accordingly, a new type of an optical receptacle is required such that the receptacle has a superior insertion/extraction performance of the ferrule, and has a characteristic hard to split out the stub therefrom.

SUMMARY OF THE INVENTION

According to one aspect of the present invention, an optical receptacle is provided. The optical receptacle includes a stub, a bush, a sleeve, and a sleeve cover. These members have tubular shape, axes of which are substantially coincide and forms an optical axis. The stub includes a lower portion and an upper portion, and secures a coupling fiber in a center thereof. The bush covers the lower portion of the stub. The sleeve covers the upper portion of the stub, and extends from an end of the stub. The sleeve cover covers the bush and the sleeve. In the present invention, the bush is press-fitted into a gap formed between the stub and the sleeve cover. The sleeve of the present invention is preferably rigid sleeve without any slit in its outer surface along the optical axis.

In the present receptacle, the bush covers the half of the stub, while the sleeve covers the rest half of the stub. Accordingly, in addition to the application of the rigid sleeve, the insertion/extraction performance of the ferrule to be inserted into the sleeve is enhanced. Further, since the bush is press-fitted into the gap formed between the stub and the sleeve cover, the stub is hard to slide out from the sleeve.

Another aspect of the present invention relates to an optical sub-assembly applying thus configured optical receptacle. The optical sub-assembly of the present invention includes, in addition to the optical receptacle, a semiconductor optical device, a package, and an alignment member. The semiconductor optical device may be a semiconductor light-emitting device such as laser diode or a semiconductor light-receiving device such as photodiode. The package includes a stem for mounting the semiconductor optical device and a cap placed on the stem. The semiconductor optical device is enclosed in a space formed by the cap and the stem. The alignment member, the optical receptacle is positioned thereon, covers a portion of the cap. In the present invention, the optical receptacle is slidable on the alignment member in a plane perpendicular to the optical axis, which enables the optical alignment in the plane. Further, the alignment member is slidable on the outer surface of the cap, which enables the optical alignment along the optical axis.

When the semiconductor optical device has a configuration of an edge emitting/receiving, a block for mounting the semiconductor optical device is placed on the stem. That is, the semiconductor optical device is mounted on a side surface of the block such that the optical axis of the semiconductor device is in parallel to the optical axis of the optical receptacle.

DETAILED DESCRIPTION OF PREFERRED EMBODIMENTS

Figure 1:
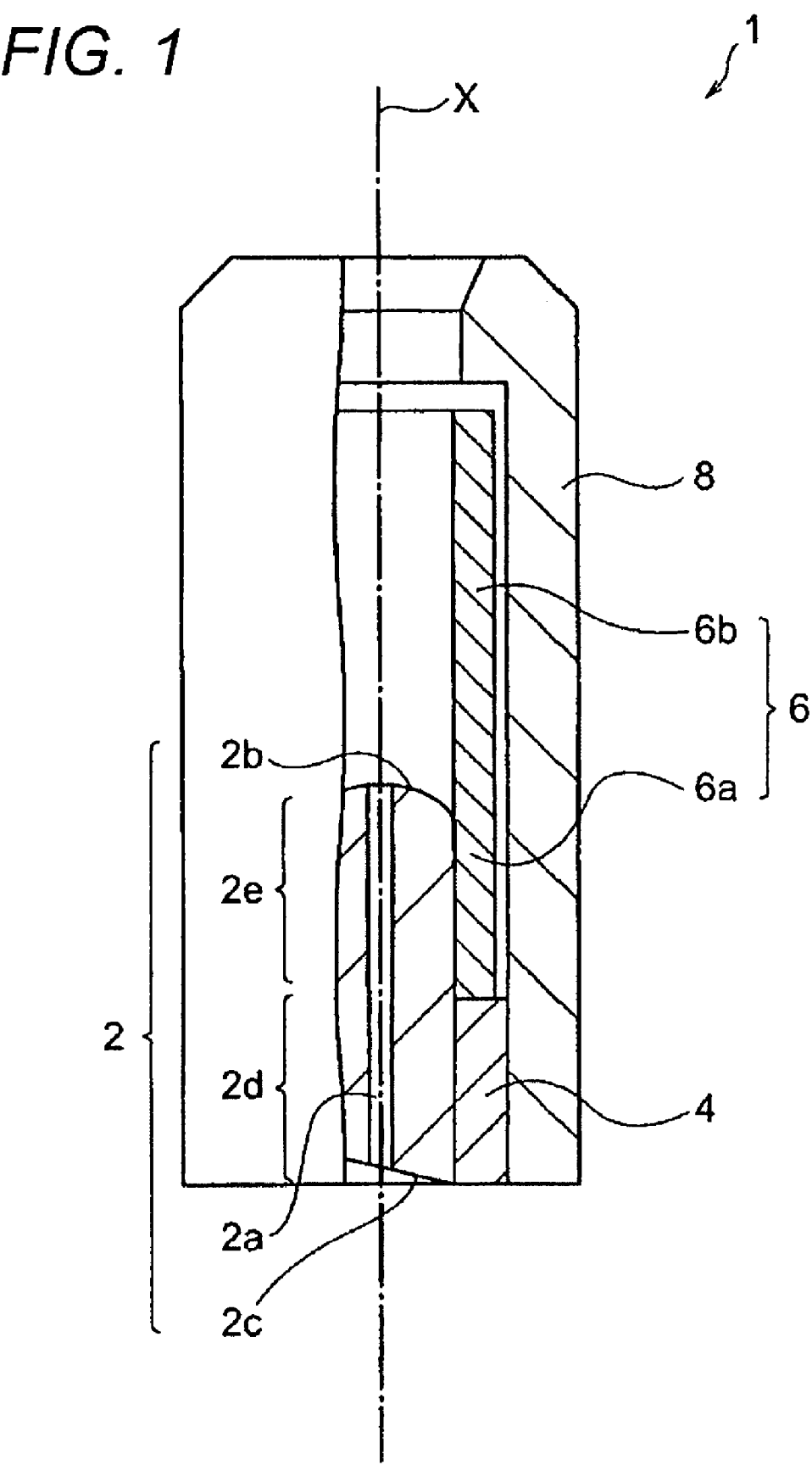
FIG. 1 is a partially cutaway side view of the optical receptacle according to the first embodiment of the present invention.

Preferred embodiments according to the present invention will be described in detail as referring to accompanying drawings. In the drawings and the descriptions, same elements will be referred by same numerals or symbols without overlapping explanations.

(First Embodiment)

FIG. 1 is a partially cutaway side view of an optical receptacle 1. The optical receptacle 1 includes a stub 2, a bush 4, a sleeve 6, and a sleeve cap 8. The stub 2 secures a coupling fiber 2a in its center bore, and may be made of ceramic such as zirconia. One end of the stub 2 is formed in spherical with a radius of, for example, 20 mm. The other end 2c of the stub 2 has a surface inclined by a predetermined angle to the axis X to reduce light reflected thereby to the axis X. In the case that the surface 2c is not inclined to the axis X, the reduction of the light reflected to the direction X may be realized by coating the surface 2c with an anti-reflection film. The stub 2 further includes a lower portion 2d and an upper portion 2e arranged along the axis X. In the present embodiment, a total length of the stub 2 is about 3 mm, and that of the lower portion 2d and the upper portion 2e is 1.5 mm, respectively.

The lower portion 2d is press-fitted into a bore of the bush 4. The bush is also a tubular member extending along the axis X, and may be made of metal such as SUS 303. The upper portion 2e is mated with a bore of the sleeve 6. In the present embodiment, the sleeve 6 is preferably the so-called rigid sleeve, in which no slit along the longitudinal axis thereof is provided.

The sleeve 6 is also tubular member having the bore, the upper portion 2e of the stub 2 is mated therewith, and extending along the axis X. The sleeve 6 includes a lower portion 6a, the stub 2 is mated therewith, and an upper portion 6b, a ferrule attributed to an optical connector is inserted thereto. The upper portion 2e of the stub 2 mates with the lower portion 6a of the sleeve. In the present embodiment, the outer diameter of the stub 2 is 1.249+/−0.005 mm, and the inner diameter of the lower portion 6a of the sleeve 6 is 1.250−/+0.001 mm. The sleeve 6 receives the ferrule attributed to an optical fiber, which is not shown in FIG. 1, and inserted from an opening of the upper portion 6b of the sleeve 6. The sleeve 6 may be made of ceramic such as zirconia, which enhances forming accuracy, namely, physical dimensions thereof, and accordingly, improves the insertion/extraction performance of the ferrule.

The sleeve cap 8 is also a tubular member extending along the axis X, and is made of metal such as SUS 303. The sleeve cap 8 may be made of resin. The sleeve cap 8 covers the sleeve 6 and has a bore into which the bush 4 is press-fitted. The bore of the sleeve cap 6 is formed to widen at the end thereof to facilitate the insertion/extraction of the ferrule.

In the optical receptacle 1 thus configured, the stub 2 is press-fitted into the sleeve 8 via the bush 4, and is rigidly fixed to the sleeve cap 8, accordingly, the stub 2 is hard to extract therefrom. Further, the lower portion 6a of the sleeve 6 is only mated with the upper portion of the stub 2, accordingly, deformation of the sleeve 6 may be prevented. Therefore, assembly of the stub 2, the bush 4, the sleeve 6 and the sleeve cover 8 can provide a superior insertion/extraction performance for the ferrule.

(Second Embodiment)

Figure 2:
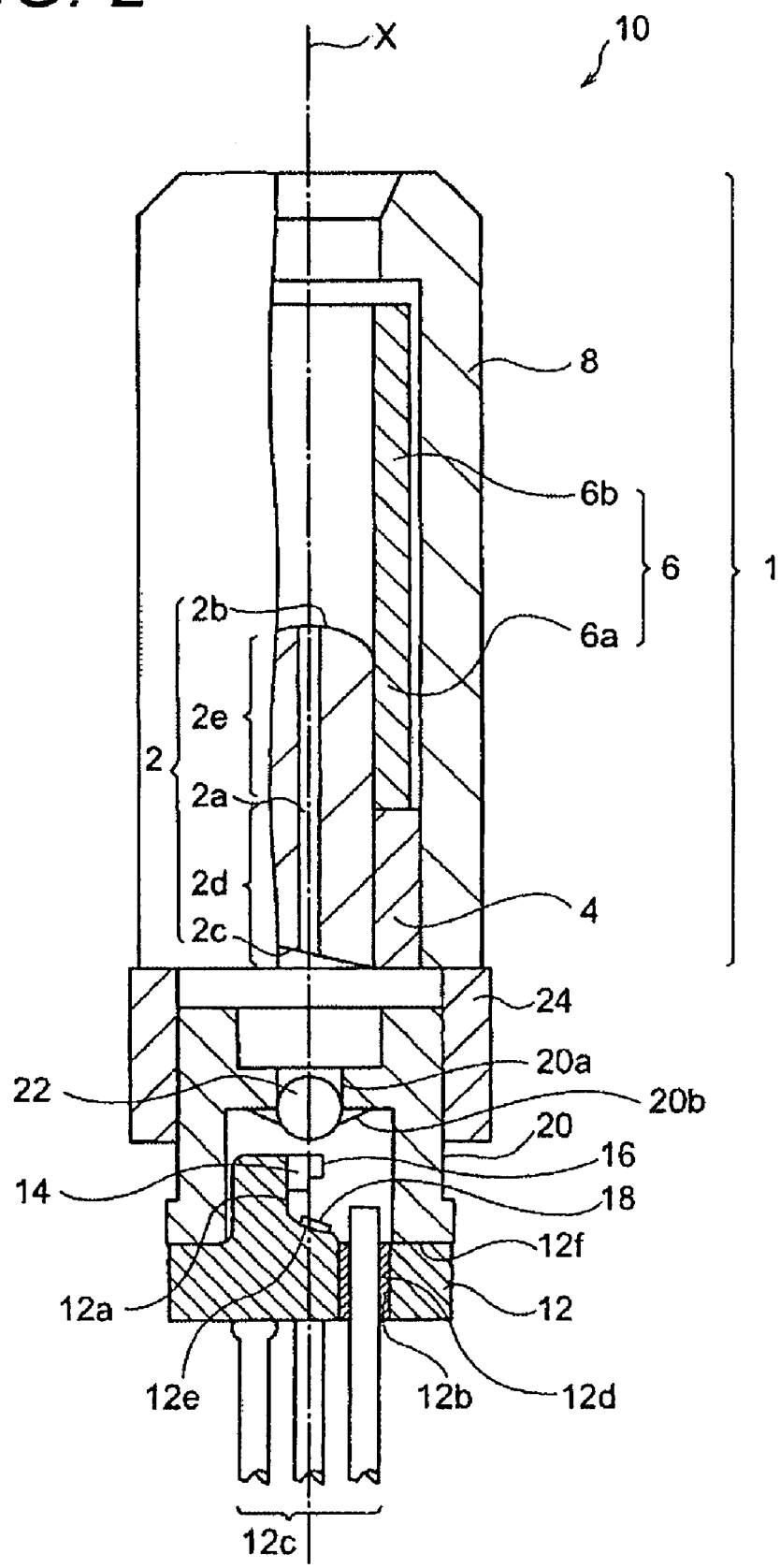
FIG. 2 is a partially cutaway side view of the transmitting optical sub-assembly of the present invention.

Next, the second embodiment of the present invention will be described as referring to FIG. 2. The second embodiment relates to transmitting optical sub-assembly (hereinafter denoted as TOSA). FIG. 2 is a partially cutaway side view of the TOSA 10. The TOSA 10 includes a stem 12, a sub-mount 14, a light-emitting device 16, a light-receiving device 18, a cap 20, a lens 22, an alignment member 24 and the optical receptacle 1 of the first embodiment.

The stem 12 mounts the light-emitting device 16 thereon. That is, the stem 12 includes a block 12a extending along the axis X, the block 12a mounts a sub-mount 14 on which the light-emitting device 16 is placed. In the present embodiment, the light-emitting device 16 is an edge-emitting type laser diode, which includes a light-reflecting facet and a light-transmitting facet and emits light to the direction along the axis X. The stem and the sub-mount may be made of metal such as iron coated with nickel or nickel and gold.

The stem 12 further includes a plurality of via holes 12b, through which lead pins 12c pass. The lead pin 12c is secured and sealed to the stem 12 with low-melting glass, seal glass, as electrically isolated from the stem 12. The lead pin 12c is electrically connected with the light-emitting device 16.

The stem 12 further includes a surface inclined to the axis X for mounting the light-receiving device 18. The light-receiving device 18 is electrically connected to the lead pin 12c, which receives light emitted from the light-reflecting facet of the light-emitting device and outputs a photo current depending on the optical power of received light to the lead pin 12c. Since the light-receiving device is mounted in the inclined surface to the axis X, light reflected at the surface of the light-receiving device does not return to the light-emitting device 16, thereby reducing the optical noise in the light-emitting device 16.

The cap 20 is placed on the periphery 12f of the stem 12, namely, the cap 20 is fixed and sealed in its end surface on the periphery 12f of the stem 12 by the resistance welding to enclose the light-emitting device 16 therein. The cap, similar to the stem 12, may also be made of iron coated with nickel or nickel and gold, and tubular shape extending along the axis X. On the top of the cap 20 is provided an aperture in which the lens 22 is fixed and sealed with low-melting glass 20b. The lens 22 focuses light emitted from the light-emitting device 16 to the tip of the coupling fiber 2a.

The side of the alignment member 24 covers the outer surface of the cap 20. That is, the cap 20 is mated with the bore formed by the side of the alignment member 24, and is slidable within the bore. On the flat end of the alignment member 24 is provided the end surface of the sleeve cover 8. The optical receptacle 1, including the sleeve cap 8, the bush 4, and the stub 2, can slide on the flat end surface of the alignment member, accordingly, the optical alignment in directions perpendicular to the axis X can be performed by sliding the optical receptacle 1 on the alignment member 24. Further, the alignment member 24 can slide on the outer surface of the cap 20, which enables the optical alignment along the axis X.

Since the TOSA 10, thus configured as described above, provides the optical receptacle 1, (1) the insertion/extraction performance of the ferrule is intrinsically provided in the TOSA 10, (2) the stub 2 does not slip out because of the press-fitting of the bush 4 between the stub 2 and the sleeve cover 8, and (3) fluctuation in the optical coupling efficiency between the stub 2 and the ferrule inserted into the sleeve 6 because of the stiffness of the rigid sleeve 6. The fluctuation in the optical coupling is called as the wiggle characteristic. When the mating between the ferrule and the sleeve is rough, and the optical fiber, which is connected to the ferrule and suspended in ordinal mode, is swung, the optical coupling between the ferrule and the sleeve may be affected thereby. In the present optical receptacle configured as previously mentioned, the optical coupling between the ferrule and the coupling fiber in the stub can be maintained in stable.

Figure 3A:
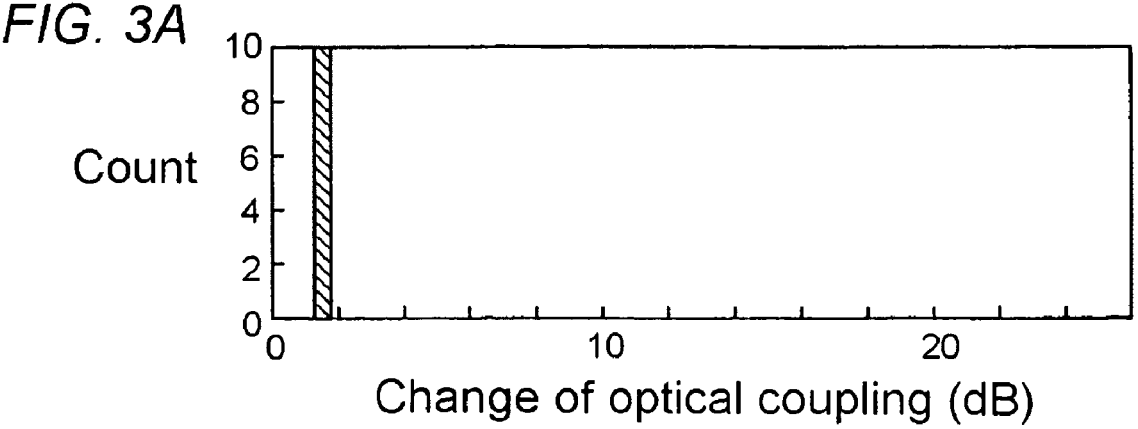
FIG. 3A shows a histogram for the change of the optical coupling efficiency between the ferrule and the optical receptacle of the present invention.
Figure 3B:
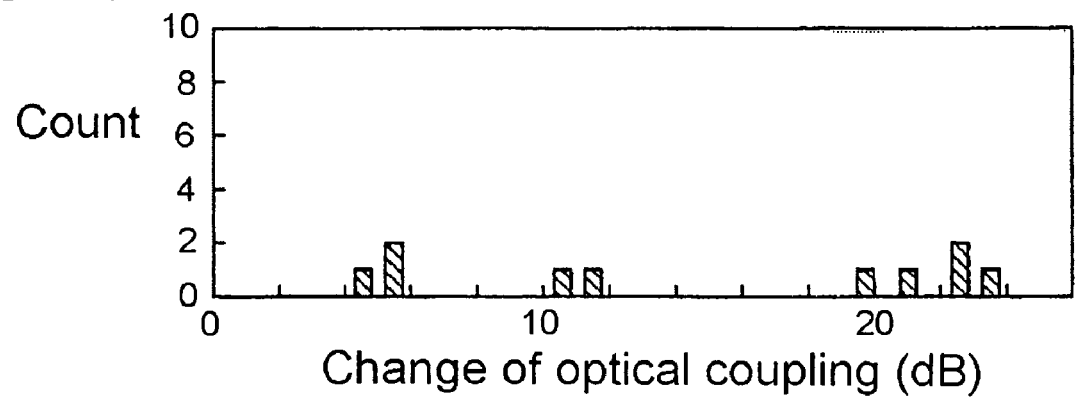
FIG. 3B shows a histogram for the change of the optical coupling efficiency of the conventional optical receptacle.

FIG. 3A is a histogram showing the change of the optical coupling for the TOSA providing the optical receptacle 1. On the other hand, FIG. 3B is a result for the conventional receptacle. The measurement was performed such that, pulling the optical fiber to directions inclined by +/−45° to the optical axis X, the ratio of the maximum to the minimum of the optical output from the other end of the optical fiber was evaluated, which was regarded as the change of the optical coupling.

As shown in FIG. 3B, the conventional optical receptacle widely fluctuates its optical output when the external force operates on the optical fiber. On the other hand in the present optical receptacle, as shown in FIG. 3A, the change of the optical coupling stabilizes even when the force is operated on the optical fiber.

(Third Embodiment)

Figure 4:
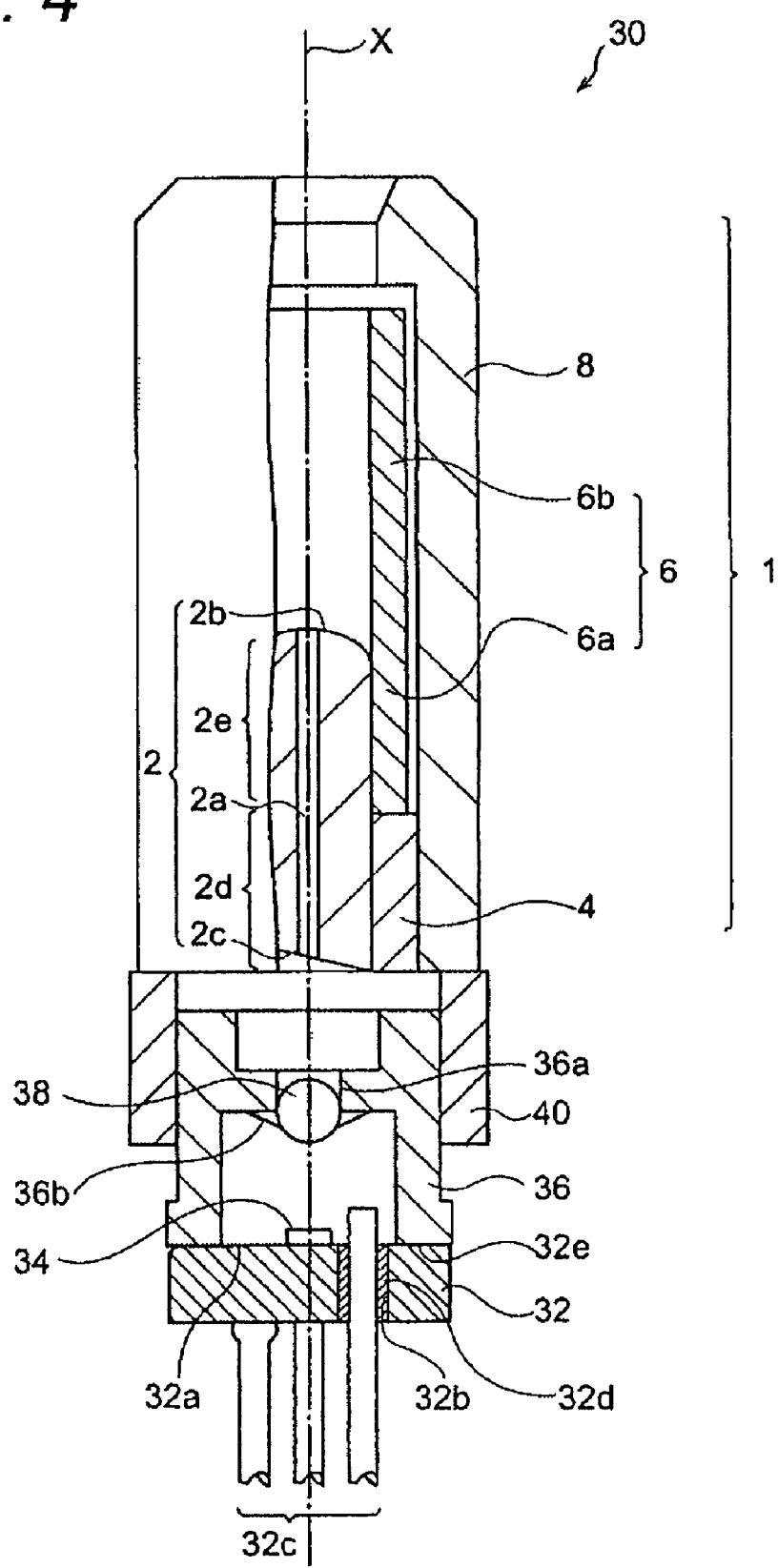
FIG. 4 is a partially cutaway side view of the receiving optical sub-assembly of the present invention.
Figure 5:
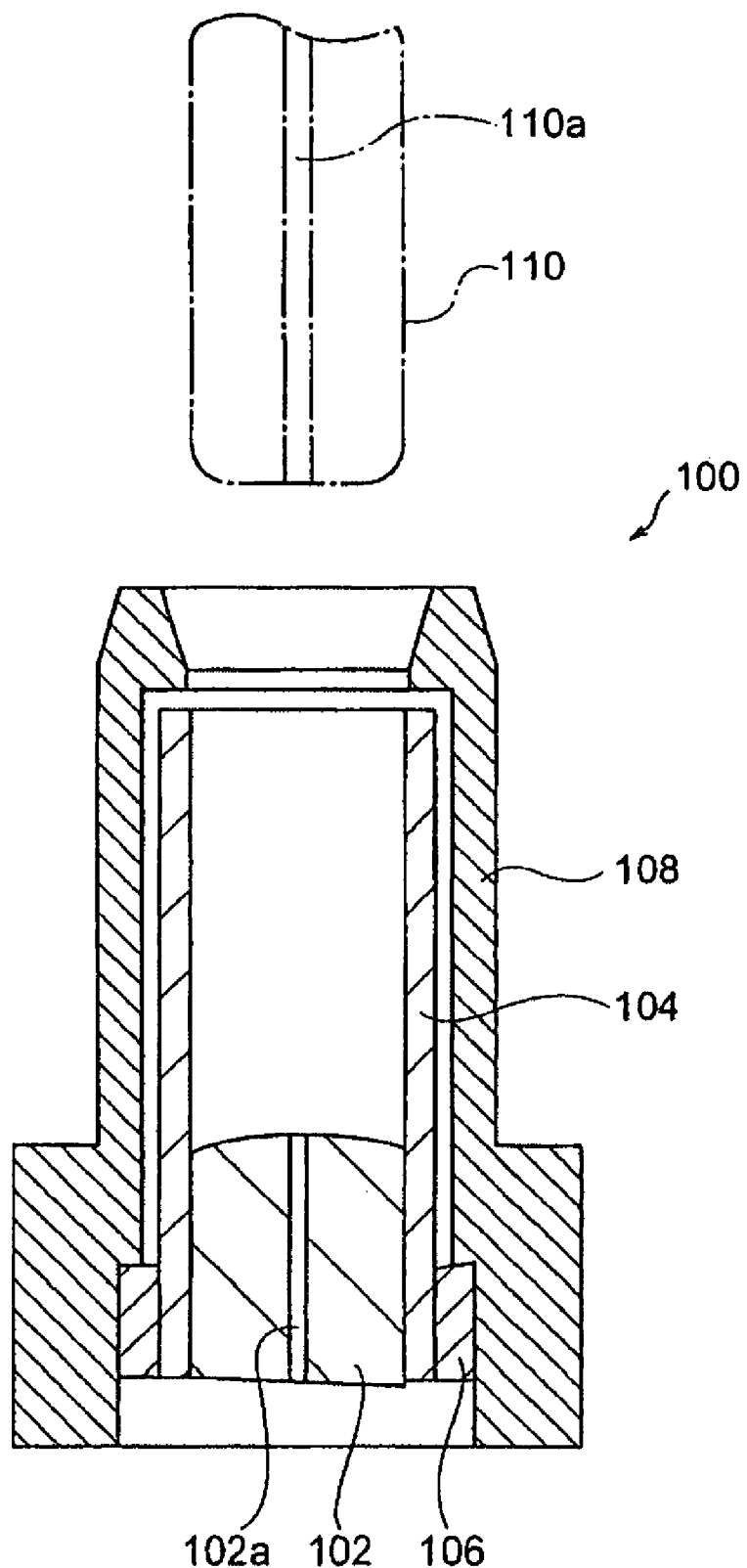
FIG. 5 is a side cross sectional view of the conventional optical receptacle.

Next, the third embodiment of the present invention will be described as referring to FIG. 4, which is a partially cutaway view of an receiving optical sub-assembly (ROSA) 30. The ROSA 30 includes a light-receiving device 34, a cap 36, a lens 38, an alignment member 40, and the receptacle 1 according to the first embodiment of the present invention.

In the ROSA 30, the light-receiving device 34 is mounted on the primary surface of the stem 32 instead of the light-transmitting device 16 in the TOSA 10. A photodiode with a surface-receiving type is used in the present embodiment, because a light-sensitive surface of the surface-receiving type photodiode exists on the primary surface thereof, and to mount the photodiode 34 on the primary surface 32a of the stem 32 directly results on that an optical axis of the light-sensitive surface is along the optical axis X. Therefore, the ROSA 30 does not includes the block 12a and the sub-mount 14 provided in the TOSA 10.

Other configurations of the ROSA, such as the cap 36, the alignment member 40, and the receptacle 1, are same as those described in the TOSA.

Thus, the optical receptacle 1, and the TOSA 10 and the ROSA 30 both including the optical receptacle 1, are described in detail with accompanying drawings. However, the present invention is not restricted to those shown in the embodiments. For, example, the stub 2 in the optical receptacle may be made of metal such as SUS 303, which enhances the holding power of the press-fitting. The metal sleeve may be secured in the sleeve cover firmer than the glass stub. Therefore, the length of the bush 4 and that of the lower portion 2d of the stub may be shortened, which results on the shrinking of the total length of the optical receptacle 1.

Such modifications and variations are not to be regarded as a departure from the spirit and scope of the invention, and all such modifications and variations as would be obvious to one skilled in the art are intended for including within the scope of the following claims.

What is claimed is:

1. An optical sub-assembly for receiving a ferrule attached to an optical fiber along an optical axis, said sub-assembly comprising:
    a stub including a lower portion and an upper portion, said stub securing a coupling fiber in a center thereof;
    a bush in direct contact with said stub for covering said lower portion of said stub;
    a sleeve in direct contact with said upper portion of said stub for covering only said upper portion thereof, said sleeve extending from said stub but not covering said bush; and
    a sleeve cover for covering said bush and said sleeve, wherein said bush is press-fitted into a gap formed between said stub and said sleeve cover.

2. The optical sub-assembly according to claim 1, wherein an end of said lower portion of said stub, an end of said bush not facing to said sleeve, and an end of said sleeve cover substantially coincide with respect to each other.

3. The optical sub-assembly according to claim 1, wherein said sleeve is a rigid sleeve.

4. The optical sub-assembly according to claim 3, wherein said sleeve is made of metal.

5. The optical sub-assembly according to claim 3, wherein said sleeve is made of ceramic.

6. The optical sub-assembly according to claim 1, wherein said stub includes an end surface inclined to a plane perpendicular to said optical axis.

7. The optical sub-assembly according to claim 1, wherein said stub includes a spherical end surface facing to said ferrule, when said ferrule is inserted into said sleeve.

8. The optical sub-assembly according to claim 1, wherein said stub is made of glass.

9. The optical sub-assembly according to claim 1, wherein said stub is made of metal.

10. The optical sub-assembly according claim 1,
    wherein said stub, said bush, said sleeve, and said sleeve cover form an optical receptacle,
    wherein said optical sub-assembly further comprises a package including:
    a stem and a cap;
    a semiconductor light-emitting device for emitting light, said semiconductor light-emitting device being mounted on said stem; and
    an alignment member for covering said cap and for placing said optical receptacle thereon, and
    wherein said optical receptacle is slidable on said alignment member in a plane perpendicular to said optical axis, and said alignment member is slidable on said cap along said optical axis.

11. The optical sub-assembly according to claim 10,
    wherein said stem further includes a block and a sub-mount thereon, said semiconductor light-emitting device being mounted on said sub-mount, and said optical sub-assembly further includes a semiconductor light-receiving device for monitoring said light emitted from said semiconductor light-emitting device.

12. The optical sub-assembly according to claim 10,
    wherein said cap includes a lens for focusing said light emitted from said semiconductor light-emitting device to said coupling fiber.

13. The optical sub-assembly according to claim 1,
    wherein said stub, said bush, said sleeve, and said sleeve cover form an optical receptacle, and
    wherein said optical sub-assembly further comprises a package including:
    a stem and a cap,
    a semiconductor light-receiving device mounted on said stem, said semiconductor light-receiving device receiving light emitted from said coupling fiber and,
    an alignment member for covering said cap and for placing said optical receptacle thereon, and
    wherein said optical receptacle is slidable on said alignment member in a plane perpendicular to said optical axis, and said alignment member is slidable on said cap along said optical axis.

* * * * *